(12) United States Patent
Makino et al.

(10) Patent No.: US 10,166,846 B2
(45) Date of Patent: Jan. 1, 2019

(54) VEHICLE DOOR MODULE

(71) Applicant: AISIN SEIKI KABUSHIKI KAISHA, Kariya-shi (JP)

(72) Inventors: Sadayuki Makino, Nagoya (JP); Hidefumi Katayama, Anjo (JP); Katsumi Chono, Hekinan (JP); Satoshi Shibayama, Nagoya (JP); Kenta Mori, Kairya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/512,971

(22) PCT Filed: Nov. 25, 2015

(86) PCT No.: PCT/JP2015/082981
§ 371 (c)(1),
(2) Date: Mar. 21, 2017

(87) PCT Pub. No.: WO2016/084819
PCT Pub. Date: Jun. 2, 2016

(65) Prior Publication Data
US 2017/0297418 A1    Oct. 19, 2017

(30) Foreign Application Priority Data

Nov. 26, 2014 (JP) .................. 2014-239254

(51) Int. Cl.
*E05F 11/48* (2006.01)
*B60J 5/04* (2006.01)
(Continued)

(52) U.S. Cl.
CPC ............... *B60J 5/0419* (2013.01); *B60J 1/17* (2013.01); *B60J 5/0416* (2013.01);
(Continued)

(58) Field of Classification Search
CPC .......... B60J 5/0419; B60J 5/0412; B60J 1/17; E05Y 15/689; E05Y 2900/55; E05Y 2201/654; E05Y 2201/688
(Continued)

(56) References Cited

U.S. PATENT DOCUMENTS 5,469,662 A * 11/1995 TenBrink ............... B60J 5/0413
  49/349
6,354,652 B1 * 3/2002 Arquevaux ........... E05F 11/488
  296/146.1
(Continued)

FOREIGN PATENT DOCUMENTS

DE  197 09 835 A1  9/1998
JP  2002-293137 A  10/2002
(Continued)

OTHER PUBLICATIONS

Extended European Search Report dated Oct. 26, 2017 in Patent Application No. 15863178.8.
(Continued)

*Primary Examiner* — Jerry E Redman
(74) *Attorney, Agent, or Firm* — Oblon, McClelland, Maier & Neustadt, L.L.P.

(57) ABSTRACT

A vehicle door module includes a base attached to an opening of an inner panel; a window glass lifting-lowering device attached to the base, the window glass lifting-lowering device provided with a window glass cable for pulling a window glass, a window glass drum for winding the window glass cable, a window glass lifting-lowering motor for rotating the window glass drum, and at least one pulley for guiding the window glass cable; and a support for supporting the pulley, the support being provided to the base and supported by an edge part of the opening of the inner panel.

6 Claims, 4 Drawing Sheets

(51) Int. Cl.
  *B60J 1/17* (2006.01)
  *E05F 15/689* (2015.01)
(52) U.S. Cl.
  CPC ........... *E05F 15/689* (2015.01); *B60J 5/0412* (2013.01); *E05Y 2201/654* (2013.01); *E05Y 2201/668* (2013.01); *E05Y 2900/55* (2013.01)
(58) Field of Classification Search
  USPC .......................................................... 49/352
  See application file for complete search history.

(56) References Cited

U.S. PATENT DOCUMENTS

| | | | | |
|---|---|---|---|---|
| 6,571,515 | B1* | 6/2003 | Samways | B60J 5/0416 49/352 |
| 6,910,730 | B2* | 6/2005 | Kinoshita | B60J 1/1861 296/146.16 |
| 7,743,559 | B2* | 6/2010 | Papi | B60J 5/0416 49/502 |
| 7,882,658 | B2* | 2/2011 | Staser | B60J 5/0416 49/352 |
| 9,168,815 | B2* | 10/2015 | Weber | B60J 5/0422 |
| 9,511,652 | B2* | 12/2016 | Barr | B60J 5/0416 |
| 9,896,874 | B2* | 2/2018 | Chono | E05F 15/689 |
| 2005/0016071 | A1* | 1/2005 | Takeda | B60J 5/0416 49/352 |
| 2008/0141592 | A1* | 6/2008 | Nakajima | B60J 5/0416 49/502 |
| 2011/0010999 | A1* | 1/2011 | Broadhead | B60J 5/0416 49/352 |
| 2013/0160371 | A1* | 6/2013 | Hayotte | B60J 5/0416 49/352 |
| 2015/0191957 | A1* | 7/2015 | Takeda | E05F 11/483 49/352 |
| 2016/0153225 | A1* | 6/2016 | Shibayama | E05F 11/54 49/352 |

FOREIGN PATENT DOCUMENTS

| | | |
|---|---|---|
| JP | 2011-46321 A | 3/2011 |
| JP | 2011-174337 A | 9/2011 |

OTHER PUBLICATIONS

International Search Report dated Feb. 9, 2016 in PCT/JP2015/082981 filed Nov. 25, 2015.
International Preliminary Report on Patentability and Written Opinion dated May 30, 2017 in PCT/JP2015/082981.

* cited by examiner

Rear ← DY → Front

VEHICLE DOOR MODULE

TECHNICAL FIELD

The present invention relates to a vehicle door module that includes a window regulator.

BACKGROUND ART

Patent document 1 describes a known technique of a window regulator. In the technique described in patent document 1, a window regulator is coupled to an inner panel.

To improve the efficiency for manufacturing vehicle doors, various kinds of units that are mounted in an inner panel may be integrally modularized. In such a technique, the window regulator is coupled to a base of the vehicle door module (for example, refer to patent document 2).

PRIOR ART DOCUMENTS

Patent Documents

Patent Document 1: Japanese Laid-Open Patent Publication No. 2011-46321
Patent Document 2: Japanese Laid-Open Patent Publication No. 2002-293137

SUMMARY OF THE INVENTION

Problems that are to be Solved by the Invention

The vehicle door module has the following shortcoming. When a window glass is stopped at the top or bottom dead center, impact force applied to a pulley of the window regulator deforms the base. Such deformation of the base occurs whenever the window glass is stopped at the top or bottom dead center. This may accelerate wear of the base.

It is an object of the present invention to provide a vehicle door module that includes a base and limits wear of the base.

Means for Solving the Problem

To solve the above problem, a vehicle door module includes a base coupled to an inner panel around an opening, a window regulator coupled to the base, and a support portion located on the base. The window regulator includes a window glass cable that draws a window glass, a window glass drum that winds the window glass cable, a window glass lifting-lowering motor that rotates the window glass drum, and at least one pulley that guides the window glass cable. The support portion supports the pulley and is supported by an edge defining the opening of the inner panel.

EMBODIMENTS OF THE INVENTION

A vehicle door module 30 will now be described with reference to FIGS. 1 to 5.

Figure 1:
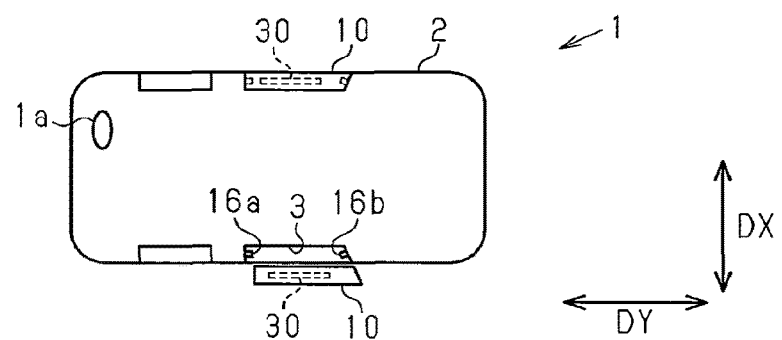
FIG. 1 is a schematic diagram of a vehicle.

FIG. 1 is a plan view of a vehicle 1. As shown in FIG. 1, a steering wheel 1a is located at a front side of the vehicle 1. In the description hereafter, the direction that conforms to a vertical direction of the vehicle 1 when a sliding door 10 is coupled to a vehicle body 2 is referred to as "the vertical direction DZ" of the vehicle door module 30. The direction that conforms to a front-rear direction of the vehicle 1 is referred to as "the front-rear direction DY" of the vehicle door module 30. The direction conforming to a vehicle width direction of the vehicle 1 is referred to as "the vehicle width direction DX" of the vehicle door module 30.

The vehicle body 2 includes an entrance 3, to which the sliding door 10 is coupled.

The sliding door 10 moves along a door rail arranged on the vehicle body 2 in the range from a fully closed position, which closes the entrance 3, to a fully open position, which fully opens the entrance 3. The sliding door 10 is coupled to the vehicle body 2 in a manner movable from the fully closed position in the vehicle width direction DX. Also, when the sliding door 10 is moved outward from the fully closed position, the sliding door 10 is movable in the front-rear direction DY.

Figure 2:
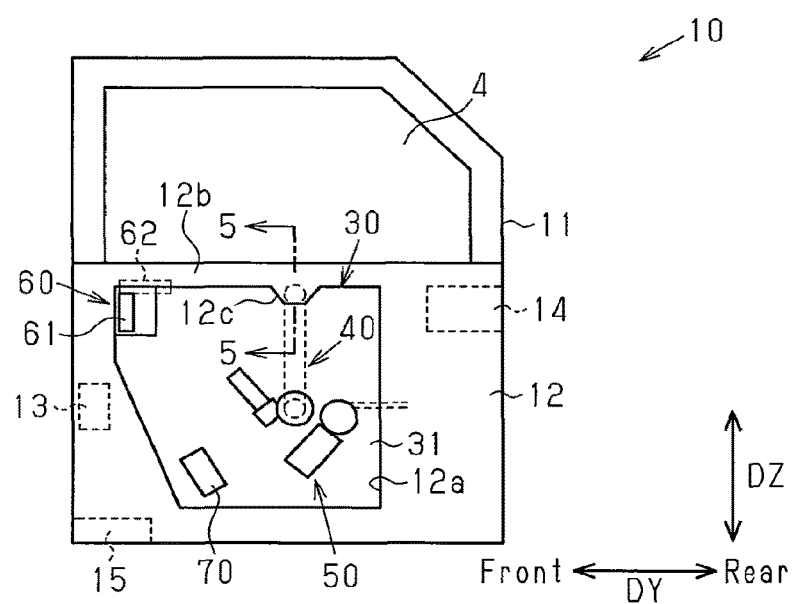
FIG. 2 is a schematic diagram of a sliding door.

FIG. 2 is a schematic diagram showing the internal structure of the sliding door 10.

The sliding door 10 includes an outer panel 11, an inner panel 12, the vehicle door module 30, which is coupled to the inner panel 12, and a window glass 4. An interior panel is coupled to an inner side (passenger compartment side) of the inner panel 12.

The inner panel 12 is coupled to an inner side of the outer panel 11. The inner panel 12 includes an opening 12a, in which the vehicle door module 30 is arranged. The inner panel 12 includes an edge 12b, which defines the opening 12a, and an attachment portion 12c, which is located on the upper side of the edge 12b. A pulley 44 of a window regulator 40, which will be described later, is attached to the attachment portion 12c. The attachment portion 12c extends toward the center of the opening 12a. The attachment portion 12c is mountain-shaped and widened from the distal end (projection end) toward the basal end as viewed in the vehicle width direction DX. The attachment portion 12c is outwardly bulged (bowl-shaped) in a cross-sectional view (refer to FIG. 5) taken in the front-rear direction DY. This structure increases the flexural strength of the attachment portion 12c. The attachment portion 12c includes an outermost part configured as a part on which the pulley 44 is set (hereafter, referred to as "the central part 12d"). The central part 12d includes a through hole 12e, which fixes a rotation shaft of the pulley 44.

The window glass 4 may be accommodated in a cavity between an inner member, which includes the inner panel 12 and the vehicle door module 30, and the outer panel 11.

A first lock unit 13 is arranged in a front portion of the sliding door 10. A second lock unit 14 is arranged in a rear portion of the sliding door 10. A third lock unit 15 is arranged in a lower portion of the sliding door 10. The first to third lock units 13 to 15 are located between the outer panel 11 and the inner panel 12.

The first lock unit 13 engages a striker 16a (refer to FIG. 1), which is arranged on a front edge of the entrance 3 of the vehicle body 2.

The second lock unit 14 engages a striker 16b (refer to FIG. 1), which is arranged on a rear edge of the entrance 3 of the vehicle body 2.

The third lock unit 15 engages a striker (not shown) arranged on a lower edge of the entrance 3 of the vehicle body 2.

The sliding door 10 is constrained by the first and second lock units 13, 14 when located in the fully closed position. The sliding door 10 is constrained by the third lock unit 15 when located in the fully open position. When the sliding door 10 is constrained by the first and second lock units 13, 14 or the third lock unit 15, movement of the sliding door 10 is restricted.

The vehicle door module 30 will now be described with reference to FIG. 3.

The vehicle door module 30 includes a resin base 31, the window regulator 40, which lifts and lowers the window glass 4, a door moving unit 50, which moves the sliding door 10, and a door opening-closing unit 60, which operates the first to third lock units 13 to 15. The window regulator 40, the door moving unit 50, and the door opening-closing unit 60 are coupled to the base 31.

The window regulator 40 includes first and second cables 41, 42 (window glass cables), which draw the window glass 4, a drum 43 (window glass drum), which winds the first and second cables 41, 42, the pulley 44, which cooperates with the drum 43 to tension the first and second cables 41, 42, a window glass lifting-lowering motor 45, which rotates the drum 43, and a carrier 46, which is coupled to a lower end of the window glass 4.

The drum 43 and the pulley 44 are located on an outer surface of the base 31. When the window glass 4 is located at the bottom dead center (lowest point of a moving range of the window glass 4), the pulley 44 is located above the lower end of the window glass 4. The window glass lifting-lowering motor 45 is located on an inner surface of the base 31 (surface of base 31 located at passenger compartment side with respect to vehicle width direction DX, hereafter referring to same surface). The window glass lifting-lowering motor 45 and the drum 43 are connected by a reduction gear 47. The reduction gear 47 includes an output shaft, which is inserted through a through hole in the base 31 and connected to the drum 43.

The pulley 44 tensions the first cable 41 that runs around the pulley 44. The first cable 41 includes one end that is connected to the drum 43 and another end that is connected to the carrier 46.

The second cable 42 is tensioned extending in a direction opposite to the first cable 41 with respect to the carrier 46. The second cable 42 includes one end that is connected to the carrier 46 and another end that is connected to the drum 43.

When the drum 43 is rotated to wind the first cable 41 or the second cable 42 around the drum 43, the carrier 46 is moved in accordance with the movement of the first cable 41 and the second cable 42. Consequently, the window glass 4 is lifted and lowered in a predetermined moving range.

The door moving unit 50 includes third and fourth cables 51, 52 (door cables), which draw the sliding door 10, a drum 53 (door drum), which winds the third and fourth cables 51, 52, and a door moving motor 54, which rotates the drum 53. The drum 53 and the door moving motor 54 are connected by a reduction gear.

The third cable 51 includes one end, which is connected to the vehicle body 2, and the other end, which is connected to the drum 53. The fourth cable 52 includes one end, which is connected to the vehicle body 2, and the other end, which is connected to the drum 53. The direction in which the third cable 51 is wound around the drum 53 is opposite to the direction in which the fourth cable 52 is wound around the drum 53. When the drum 53 is rotated to wind the third cable 51 or the fourth cable 52 around the drum 53, the sliding door 10 is moved.

The door opening-closing unit 60 includes an inner handle 61, which is located at an inner side of the sliding door 10, and a transmission mechanism 63, which operates the first to third lock units 13 to 15 based on various kinds of operation. An outer handle 62, which is coupled at an outer side of the sliding door 10, is connected to the door opening-closing unit 60.

The inner handle 61 is rotationally coupled to the base 31 of the vehicle door module 30. The inner handle 61 projects inwardly (toward passenger seat) from the interior panel in the vehicle width direction DX.

When the inner handle 61 is rotated in a first predetermined direction by a first predetermined operation (hereafter, referred to as "the closing operation"), the rotation is transmitted to the third lock unit 15 by the transmission mechanism 63 to operate the third lock unit 15.

When the inner handle 61 is rotated in a second predetermined direction by a second predetermined operation (hereafter, referred to as "the opening operation"), the rotation is transmitted to each of the first and second lock units 13, 14 by the transmission mechanism 63 to operate the first and second lock units 13, 14.

When the outer handle 62 is rotated in a predetermined direction by a predetermined operation, the rotation is transmitted to the first to third lock units 13 to 15 by the transmission mechanism 63. The first to third lock units 13 to 15 are operated by the transmitted power.

The structure of the base 31 and the layout of each component will now be described with reference to FIGS. 3 and 4. As shown in FIG. 3, the vehicle door module 30 includes a support portion 33. FIG. 4 is a perspective view of the support portion 33 taken from an outer side.

The base 31 is formed from a resin. The base 31 is formed, for example, from a foamed resin. Foamed resin increases the thickness of the base 31 as compared to a non-foamed resin. This increases the strength and rigidity of the base 31.

A waterproof sealant is applied to a peripheral edge of the base 31. The vehicle door module 30 is coupled to the inner panel 12 around the opening 12a squeezing the waterproof sealant. This limits the entrance of water from a gap between the peripheral edge of the base 31 and the opening 12a of the inner panel 12.

The base 31 includes an upper edge having a portion recessed toward the center (hereafter referred to as "the cutaway portion 32" since it seems to be cut away when formed). The support portion 33, which supports the pulley 44 of the window regulator 40, projects from the base 31. The support portion 33 is positioned in alignment with the cutaway portion 32 as viewed in the vehicle width direction DX. The cutaway portion 32 is configured to be fitted to the attachment portion 12c of the inner panel 12. The cutaway portion 32 is, for example, V-shaped as viewed in the vehicle width direction DX.

The support portion 33 includes an extension 33a, which extends from an edge of the cutaway portion 32, and a part arranged on the extension 33a to carry the pulley 44 of the window regulator 40 (hereafter, referred to as "the pulley mount 33b").

Figure 4:
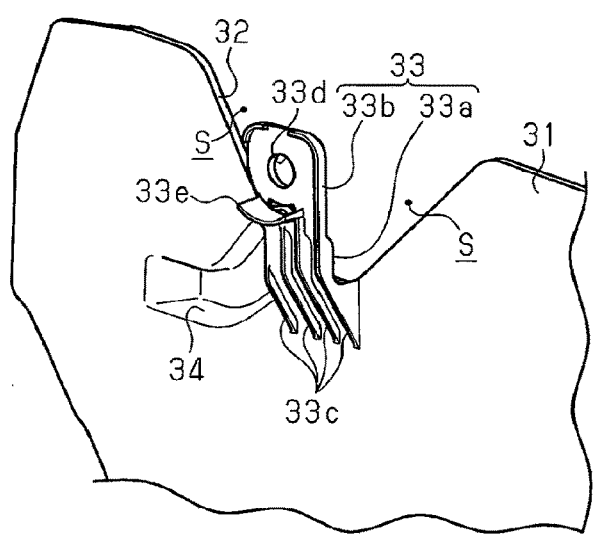
FIG. 4 is a perspective view of a support portion.
Figure 5:
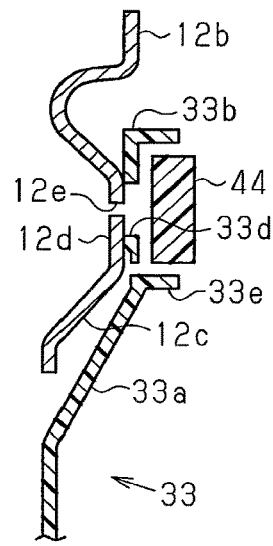
FIG. 5 is a cross-sectional view taken along line 5-5 in FIG. 2.

As shown in FIGS. 4 and 5, the support portion 33 obliquely extends from the lowest part of the cutaway portion 32 upward and outward in the vehicle width direction DX. More specifically, the support portion 33 is configured so that the pulley mount 33b and the base 31 are located at separate positions in the vehicle width direction DX (thickness-wise direction of the base 31, or direction orthogonal to a surface of the base 31). Thus, a gap S extends at opposite sides of the support portion 33 in the vehicle width direction DX and the front-rear direction DY.

The support portion 33 is configured so that when the attachment portion 12c of the inner panel 12 is fitted to the cutaway portion 32 of the base 31, the pulley mount 33b is located at the outer surface side of the attachment portion 12c. The pulley 44 is located at an outer side of the pulley mount 33b in the vehicle width direction DX.

As shown in FIG. 4, the extension 33a includes an outer surface, which includes reinforcement portions that reinforce the extension 33a. The reinforcement portions are, for example, a plurality of ribs 33c integrally formed with the support portion 33. The ribs 33c extend to the base 31. More specifically, each rib 33c includes one end, which is connected to the base 31, and the other end, which extends to a distal end of the extension 33a of the support portion 33. The pulley mount 33b includes a through hole 33d, which supports the rotation shaft of the pulley 44. The pulley mount 33b includes a wall 33e, which is arranged around the pulley 44.

The window regulator 40 is arranged on the base 31 as follows (refer to FIG. 3). More specifically, the window glass lifting-lowering motor 45 and the reduction gear 47 are arranged on a central lower portion of the inner surface of the base 31. The drum 43 of the window regulator 40 is arranged on the outer surface of the base 31.

The door opening-closing unit 60 is arranged on an upper front portion of the inner surface of the base 31. The door opening-closing unit 60 includes the inner handle 61 and a plurality of levers (transmission mechanism 63). Some of the levers are connected to the first to third lock units 13 to 15 by power transmission cables 17. The power transmission cables 17 extend from the door opening-closing unit 60 to the outer surface side of the base 31 passing over the cutaway portion 32 of the base 31. Then, the power transmission cables 17 extend along a guide groove 34, which will be described later. Each power transmission cable 17 is connected to the corresponding one of the first to third lock units 13 to 15.

A power supply module 70, which supplies electric power to each electric component such as the window glass lifting-lowering motor 45, is coupled to the base 31. The power supply module 70 includes a plurality of electric power supply cables 71. Some of the electric power supply cables 71 are connected to electric components located at the inner surface side of the base 31. The remaining electric power supply cables 71 are extended to the outer surface side of the base 31 passing over the cutaway portion 32 of the base 31. The remaining electric power supply cables 71 are further extended along the guide groove 34 and connected to electric components located at the outer surface side of the base 31.

As shown in FIG. 4, the cutaway portion 32 of the base 31 includes the guide groove 34, which guides the power transmission cables 17 and the electric power supply cables 71. The guide groove 34 extends from the edge of the cutaway portion 32 of the base 31 at a location separated from the support portion 33. The guide groove 34 is inwardly recessed in the vehicle width direction DX. The guide groove 34 includes an end located at a side corresponding to the cutaway portion 32. The end of the guide groove 34 defines an open end surface including a surface that is orthogonal to a surface including the cutaway portion 32 (generally flat surface extending in a direction in which the base 31 extends). More specifically, the guide groove 34 includes an open end 34a (refer to FIG. 3) orthogonal to the direction in which the base 31 extends. The power transmission cables 17 and the electric power supply cables 71 extend from the inner surface side to the outer surface side of the base 31 through the open end 34a. Thus, the power transmission cables 17 and the electric power supply cables 71 will not be largely bent in a range extending from the inner surface side to the outer surface side of the base 31. Additionally, since the open end 34a of the guide groove 34 is located in the edge of the cutaway portion 32, the power transmission cables 17 and the electric power supply cables 71 only need to be placed on the cutaway portion 32 to extend from the inner surface side to the outer surface side of the base 31. Such a task is easier than the task for inserting the power transmission cables 17 and the electric power supply cables 71 into a through hole of the base 31.

The open end 34a of the guide groove 34 is orthogonal to the direction in which the base 31 extends (surface of the base 31). Thus, when the vehicle door module 30 is located around the opening 12a of the inner panel 12, the power transmission cables 17 and the electric power supply cables 71 will not be held and pressed by the attachment portion 12c of the inner panel 12 and the base 31. This limits adverse effects on the function of the power transmission cables 17 and the electric power supply cables 71.

The vehicle door module 30 of the present embodiment has the advantages described below.

(1) In the present embodiment, the base 31 includes the support portion 33, which supports the pulley 44 of the window regulator 40. The support portion 33 is supported by the edge 12b defining the opening 12a of the inner panel 12.

In this structure, the pulley 44 is fixed to the inner panel 12 by the support portion 33. Thus, when the window glass 4 is stopped at the top or bottom dead center, impact force is applied to the pulley 44 of the window regulator 40 and dispersed to the inner panel 12. This attenuates the impact force applied to the base 31 and the support portion 33 and limits wear of the base 31.

(2) In the embodiment, the attachment portion 12c, to which the pulley 44 is attached, extends from the edge 12b defining the opening 12a of the inner panel 12 toward the center of the opening 12a. The base 31 includes the cutaway portion 32, to which the attachment portion 12c of the inner panel 12 is fitted. The support portion 33 projects from the edge of the cutaway portion 32 so that the support portion 33 is located at a position separated from the base 31. When the base 31 is located around the opening 12a of the inner panel 12 so that the attachment portion 12c of the inner panel 12 is fitted to the cutaway portion 32 of the base 31, the pulley mount 33b of the support portion 33 is positioned in alignment with the attachment portion 12c.

In this structure, the gap S extends in the vehicle width direction DX between the periphery of the cutaway portion 32 and the support portion 33, which is located at a position separated from the base 31.

When coupling the vehicle door module 30 to the inner panel 12, the attachment portion 12c of the inner panel 12 is inserted into the cutaway portion 32 to locate the base 31 around the opening 12a of the inner panel 12. When the inner panel 12 is coupled in such a manner, the support portion 33 interferes with the attachment portion 12c. In this regard, in the above structure, the gap S extends between the periphery of the cutaway portion 32 and the support portion 33. This limits the interference of the support portion 33 with the attachment portion 12c and facilitates the coupling of the vehicle door module 30.

(3) In the embodiment, the base 31 includes the guide groove 34. The guide groove 34 guides the electric power supply cables 71 and the power transmission cables 17, which are located at the inner surface side of the base 31, to the outer surface side of the base 31. The guide groove 34 is inwardly recessed in the vehicle width direction DX and includes the open end 34a in the edge of the cutaway portion 32.

For example, the base 31 may include a through hole as a means for arranging the cables (e.g. the electric power supply cables 71 and the power transmission cables 17) so that the cables extend from the inner surface side to the outer surface side of the base 31. In this case, the cables 17, 71 need to be inserted into the through hole. This is burdensome. In this regard, in the above structure, the cutaway portion 32 of the base 31 includes the guide groove 34, which guides the cables 17, 71. Thus, the cables 17, 71 only need to be placed on the cutaway portion 32 to extend the cables 17, 71 from the inner surface side to the outer surface side of the base 31. This facilitates the task for coupling the cables 17, 71.

(4) In the embodiment, the support portion 33 is reinforced by the ribs 33c (reinforcement portions). This structure limits wear of the support portion 33.

(5) In the embodiment, the open end 34a of the guide groove 34 is orthogonal to the direction in which the base 31 extends. Thus, when the vehicle door module 30 is located around the opening 12a of the inner panel 12, the power transmission cables 17 and the electric power supply cables 71 will not be held by the attachment portion 12c of the inner panel 12 and the base 31. This limits adverse effects on the function of the power transmission cables 17 and the electric power supply cables 71.

(6) In the embodiment, when the window glass 4 is located at the bottom dead center, the pulley 44 is located above the lower end of the window glass 4.

Although the waterproof sealant is applied to the peripheral edge of the base 31, the waterproof sealant is not arranged around the support portion 33. This is because the support portion 33 projects in a manner separated from the edge of the cutaway portion 32 so that the support portion 33 overlaps the attachment portion 12c of the inner panel 12. Thus, when the window glass 4 is wet and accommodated between the inner panel 12 and the outer panel 11, water may leak from the periphery of the support portion 33 to the inner side (passenger seat side) of the vehicle door module 30. Particularly, if the pulley 44 is located below the lower end of the window glass 4 when the window glass 4 is located at the bottom dead center, droplets fall from the lower end of the window glass 4 and wet the pulley 44 and the support portion 33. The water moves on the support portion 33 and enters the inner side of the vehicle door module 30. In this regard, in the above structure, that is, the structure in which the pulley 44 is located above the lower end of the window glass 4 when the window glass 4 is located at the bottom dead center, droplets falling from the lower end of the window glass 4 do not fall onto the pulley 44 and the support portion 33. This limits entrance of water through a path such as that described above.

Other embodiments will now be described.

Figure 3:
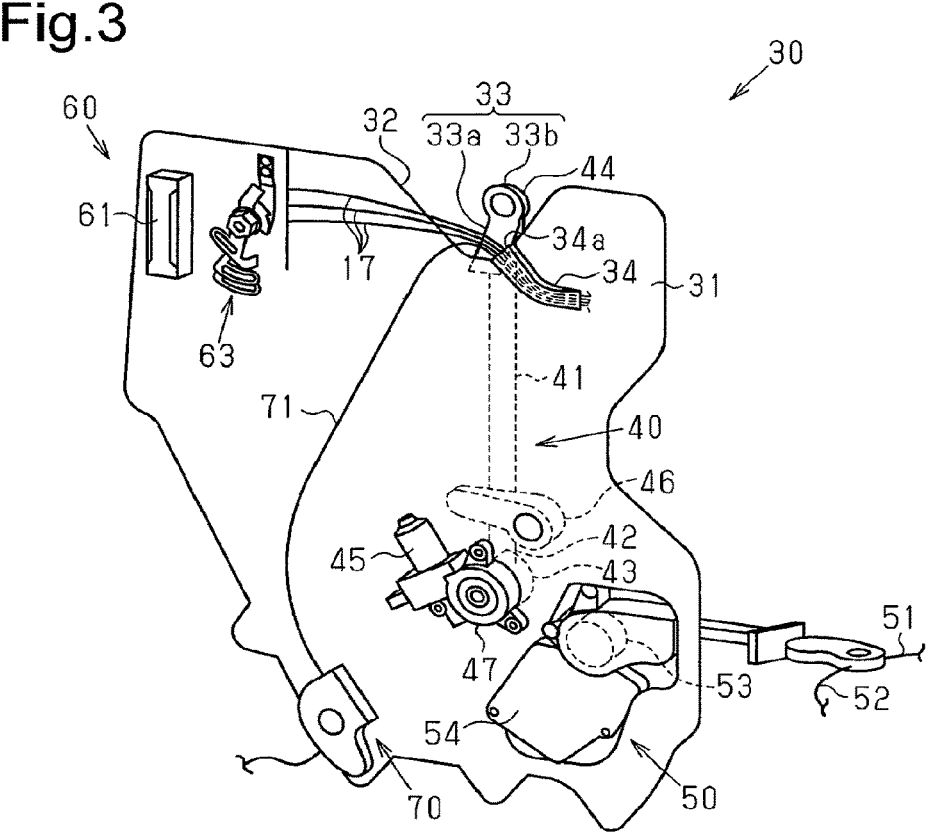
FIG. 3 is a perspective view of a vehicle door module.

In the above embodiment, as shown in FIG. 3, the support portion 33 of the base 31 is configured to divide the inner gap defined by the cutaway portion 32 substantially in half. The support portion 33 is not limited to this configuration.

Figure 6:
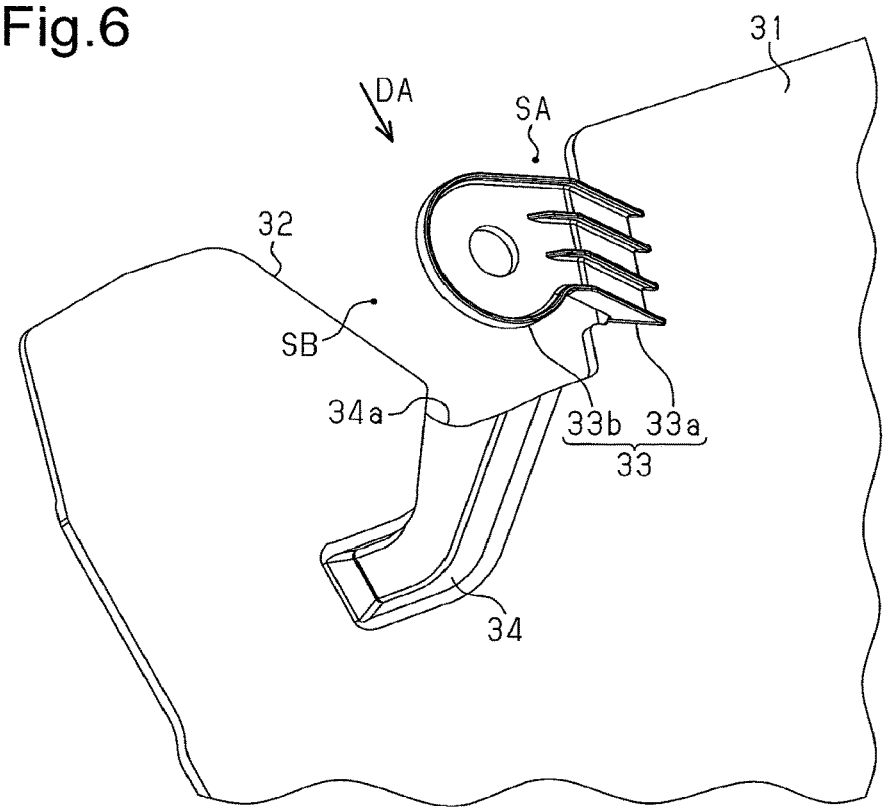
FIG. 6 is a perspective view showing a modified example of a support portion.

As shown in FIG. 6, when the base 31 is located around the opening 12a of the inner panel 12, the support portion 33 extends, for example, to intersect an extension direction DA of the attachment portion 12c. More specifically, two gaps SA, SB extend at opposite sides of the support portion 33 so that one of the gaps SA, SB is larger than the other. The extension direction DA of the attachment portion 12c refers to the direction in which the attachment portion 12c extends from a lower edge of the window frame. The attachment portion 12c substantially extends downward.

When coupling the vehicle door module 30 to the inner panel 12, the vehicle door module 30 approaches the opening 12a of the inner panel 12 so that the attachment portion 12c is inserted into the larger one of the two gaps SA, SB. More specifically, when the vehicle door module 30 is moved in the front-rear direction DY of the inner panel 12, the support portion 33 may be arranged at an outer side of the attachment portion 12c of the inner panel 12.

Figure 7:
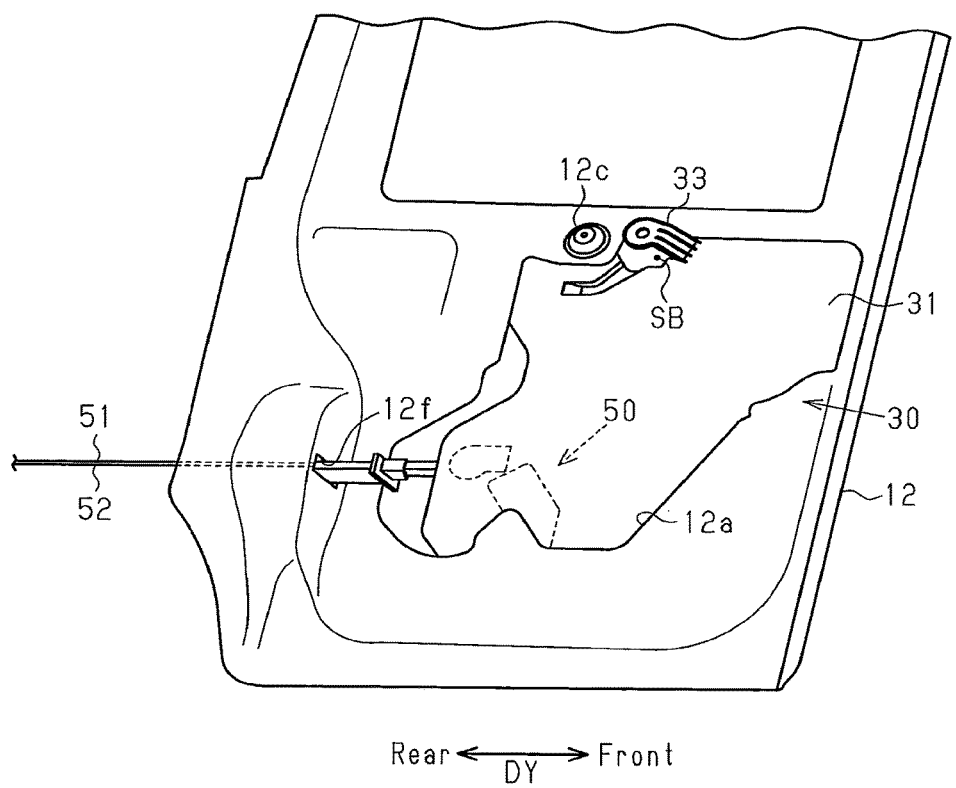
FIG. 7 is a schematic diagram showing a process for coupling a door module of the modified example.

A method for coupling the vehicle door module 30 to the inner panel 12 will now be described with reference to FIG. 7. FIG. 7 is a diagram of the inner panel 12 as viewed from an outer side.

When coupling the vehicle door module 30 to the inner panel 12, the vehicle door module 30 is first located at the front of the inner panel 12. Then, the vehicle door module 30 is moved rearward. As described above, the attachment portion 12c of the inner panel 12 is inserted into the gap SB between the support portion 33 and the base 31. Consequently, the support portion 33 is arranged at the outer side of the attachment portion 12c in the vehicle width direction DX.

If the two gaps SA, SB, which extend at opposite sides of the support portion 33, have substantially the same size, the vehicle door module 30 is located below the inner panel 12 and then moved upward from that position. Consequently, the support portion 33 is arranged at the outer side of the attachment portion 12c of the inner panel 12. The task for lifting the vehicle door module 30 is a large burden to the operator. In this regard, in the above structure, the task for lifting the vehicle door module 30 is not performed. Thus, the burden is relatively small. Thus, the structure of the above support portion 33 reduces the burden on the operator when coupling the vehicle door module 30 to the inner panel 12 as compared to when the two gaps SA, SB have substantially the same size.

As shown in FIG. 7, when the direction in which the third and fourth cables 51, 52 are drawn out of the door moving unit 50 conforms to the direction in which the support portion 33 projects, the following advantages are obtained.

When coupling the vehicle door module 30 to the inner panel 12, the vehicle door module 30 is moved rearward as described above.

At this time, the cables 51, 52, which are drawn out of the door moving unit 50, are directed toward the inner panel 12. More specifically, the direction in which the third and fourth cables 51, 52 are moved conforms to the direction in which the third and fourth cables 51, 52 are drawn out of the door moving unit 50. This facilitates the insertion of the third and fourth cables 51, 52 into a cable insertion hole 12f of the inner panel 12. Thus, the third and fourth cables 51, 52 are easily arranged in the inner panel 12.

In the above embodiment, a unit differing from the above-described units may be coupled to the base 31 of the vehicle door module 30. For example, an acoustic speaker unit may be coupled.

In the above embodiment, the door opening-closing unit 60 includes a plurality of levers. However, the door opening-closing unit 60 is not limited to this configuration. Also, the inner handle 61 is not limited to the configuration of the embodiment.

In the above embodiment, the window regulator 40 is configured to tension the cables 41, 42 with the single pulley 44 and the drum 43. However, the window regulator 40 is not limited to this configuration. The window regulator 40 may be configured to tension the cables 41, 42 with two pulleys and the drum 43 or four pulleys and the drum 43.

In the above embodiment, the technique is applied to the vehicle door module 30 coupled to the sliding door 10. However, the technique may be applied to the vehicle door module 30 that is coupled to a swing door.

The invention claimed is:

1. A vehicle door module comprising:
    a base coupled to an inner panel around an opening;
    a window regulator coupled to the base, wherein the window regulator includes a window glass cable that draws a window glass, a window glass drum that winds the window glass cable, a window glass lifting-lowering motor that rotates the window glass drum, and at least one pulley that guides the window glass cable; and
    a support portion located on the base, wherein the support portion supports the pulley and is supported by an edge defining the opening of the inner panel, wherein
    the edge defining the opening of the inner panel includes an attachment portion that extends toward a center of the opening, wherein the pulley is attached to the attachment portion,
    the base includes a cutaway portion to which the attachment portion is fitted, wherein the support portion projects from an edge of the cutaway portion so that the support portion is located at a position separated from the base, and
    the support portion includes a pulley mount, which is a part on which the pulley is mounted, wherein when the base is located on the inner panel around the opening so that the attachment portion is fitted to the cutaway portion, the pulley mount is positioned in alignment with the attachment portion.

2. The vehicle door module according to claim 1, wherein when the base is located around the opening of the inner panel, the support portion intersects an extension direction of the attachment portion.

3. The vehicle door module according to claim 2, further comprising:
    a door moving unit located on the base, wherein the door moving unit moves a vehicle door including the inner panel, wherein
    the door moving unit includes a door cable that is connected to a vehicle body and a door drum that winds the door cable,
    the door moving unit is configured to move the vehicle door by winding the door cable with the door drum, and
    the door cable is drawn out of the door moving unit in a direction that conforms to a direction in which the support portion projects.

4. The vehicle door module according to claim 1, wherein
    the base includes a guide groove that guides at least one of an electric power supply cable and a power transmission cable, which are located at an inner surface side of the base, to an outer surface side of the base, and
    the guide groove is inwardly recessed in a vehicle width direction and includes an open end located in the edge of the cutaway portion.

5. The vehicle door module according to claim 1, further comprising:
    a reinforcement portion that reinforces the support portion.

6. The vehicle door module according to claim 1, wherein when the window glass is located at a lowest point in a moving range of the window glass, the pulley is located above a lower end of the window glass.

* * * * *